United States Patent
Burgess

Patent Number: 5,864,134
Date of Patent: Jan. 26, 1999

[54] AUTOMATIC GARAGE DOOR CLOSING DEVICE WITH A DOOR POSITION DETECTOR SWITCH

[76] Inventor: Donald A. Burgess, 2949 Mayfair Ct., Clearwater, Fla. 33761-3354

[21] Appl. No.: 901,588

[22] Filed: Jul. 28, 1997

Related U.S. Application Data

[60] Provisional application No. 60/022,405 Jul. 30, 1996.

[51] Int. Cl.$^6$ ............................................. G01V 9/04
[52] U.S. Cl. ................................. 250/221; 49/31
[58] Field of Search ........................... 250/221, 214 SW, 250/214 AL; 49/29, 31

[56] References Cited

U.S. PATENT DOCUMENTS 5,752,343  5/1998  Quintus .......................................... 49/29

Primary Examiner—Que Le
Attorney, Agent, or Firm—Ronald E. Smith

[57] ABSTRACT

A garage door opener is retrofitted with a device that causes a garage door to close after it has been open for a predetermined amount of time. In a garage door of the type having a light that is activated when the door is opened or closed, a photocell is mounted in close proximity to the light to detect the presence or absence of light. When light is detected, the photocell conducts and prevents a first automatic switch, such as a silicon-controlled rectifier, from conducting. When absence of light is detected, the first automatic switch closes and a capacitor discharges through the first automatic switch and throws a second automatic switch, such as a transistor, that is electrically connected in parallel to a manually-operated switch for opening and closing the garage door. When the second automatic switch conducts, it mimics closing of the manually-operated switch and thus effects closing of the garage door. The circuit is enabled by a spring-loaded plunger that holds a pair of electrical contacts apart from one another only when the door is open.

14 Claims, 3 Drawing Sheets

AUTOMATIC GARAGE DOOR CLOSING DEVICE WITH A DOOR POSITION DETECTOR SWITCH

BACKGROUND OF THE INVENTION

This application claim the benefit of Provisional application Ser. No. 60/022,405, filed Jul. 30, 1996.

1. Field of the Invention

This invention relates to a device that controls a garage door opener so that it automatically closes an open garage door after the lapse of a predetermined amount of time.

2. Description of the Prior Art

Devices that open and close garage doors are commonly referred to as garage door openers. That terminology will sometimes be used herein, although it should be understood that the term garage door opener refers to a garage door closer as well.

There are two different types of switches for actuating a garage door opener. The first type is a normally open, momentary contact (push button) switch that is manually operated; it is permanently mounted on a structural wall at a convenient location. The second type is actuated by a portable, very high frequency, short range transmitter that is typically kept in a vehicle. The transmitter sends an encoded signal that is received and decoded by a receiver mounted in a garage; the receiver includes an antenna and a decoder and generates a signal that actuates a mechanical means for opening or closing the door upon reception of an authorized signal.

The mechanical means is typically a reversible electric motor. A nonreversible motor may also be used if modified to include clutches or other suitable mechanical means that enable it to perform the functions of a reversible motor.

Typically, limit switches are provided in a garage door opener controller means to shut down the motor when the door reaches its fully opened or fully closed position. Moreover, the controller means includes a door direction reversing means to reverse the direction of door travel at the conclusion of each door movement, i.e., when a door has been fully opened and the motor shut off, the controller means reverses the direction of the means controlling the direction of door travel so that the next motor activation results in door closing, and vice versa.

Additionally, most garage door openers include safety means to open the door when the mechanism is in its door-closing mode if an obstacle is encountered as the door lowers.

Devices have also been patented for closing, upon the expiration of a predetermined amount of time, garages doors that have been left open inadvertently. This feature enhances the security of the garage and of the attached dwelling, if any, i.e., it helps prevent theft and burglaries of the type commonly associated with open garage doors. It also saves a homeowner from interrupting a trip to make a return visit to the house just to check on the position of the garage door.

The needed device should have a structure that makes it economically feasible to include it in new garage door openers as a part of their original equipment. It should also be provided as a package suitable for retrofit applications as well.

However, in view of the art considered as a whole at the time the present invention was made, it was not obvious to those of ordinary skill in this art how the needed garage door opener could be provided.

SUMMARY OF THE INVENTION

The longstanding but heretofore unfulfilled need for an apparatus that overcomes the limitations of the prior art is now met by a new, useful, and nonobvious invention.

The present invention is retrofit onto an automatic garage door closer that works with a motor means to close a garage door that has been left open. The door closer includes a normally open, manually-operated, momentary contact switch means for opening and closing a garage door, and a controller means for controlling operation of a motor means and for activating a light source upon opening of the garage door and for extinguishing the light source a predetermined amount of time after the garage door has been opened.

The novel structure further includes a light-detecting means for detecting presence or absence of light. A first automatic switch means is actuated when the light-detecting means detects absence of light.

A second automatic switch means is actuated when a storage means for storing electrical energy discharges in response to said detection of absence of light; the current released by the storage means flows through the first automatic switch means and actuates the second automatic switch means.

The second automatic switch means is electrically connected in parallel to the manually-operated switch means so that actuating the second automatic switch means actuates the motor means and causes closing of the door. Accordingly, a garage door left open closes when the light is extinguished by the conventional controller means.

The light detecting means is electrically connected in series with a resistor so that a junction between the light-detecting means and the resistor is held at substantially ground potential when the light-detecting means is detecting light and so that the junction is at a substantially higher potential than ground when the light-detecting means detects absence of light. The light-detecting means is in a conductive state when detecting light and is in a nonconductive state when detecting absence of light.

The light-detecting circuit is enabled only when a garage door is in its fully open configuration. The enabling means is a door position-detector switch that is electrically connected in parallel with the light-detecting element. The door-position detector switch includes a slideably mounted spring-loaded plunger having a pair (leading and trailing) of fixed position electrical contacts at its opposite ends and an electrical contact positioned therebetween that is mounted to the plunger so that it follows the axial displacement of the plunger. Such axial displacement is caused by a conventional garage door trolley that displaces the leading end of the plunger, compressing the spring, when the garage door is fully open. When the garage door is closed, the spring unloads and urges the plunger and hence the movable contact into contacting relation to he leading contact so that the light-detecting circuit is disabled. When the garage door is fully open, the movable contact and the leading contact are driven away from one another so that the light-detecting circuit is enabled.

The light-detecting circuit may be disabled even when the door is open by causing the spring to unload without displacing the trolley. This can be accomplished by adding a flexible extension member to the leading end of the plunger and by manually misaligning said flexible extension member from its alignment with the trolley so that the plunger spring unloads.

It is a primary object of this invention to provide a means for retrofitting a conventional garage door opener with a device that will cause the opener to close a garage door that has been left open for a predetermined amount of time.

Another object is to harness the deactivation of a light by a conventional garage door opener controller means as the means for triggering the closing of a garage door that has been left open.

Still another object is to provide a novel light-detecting cicuit that is enabled only when a garage door is open and which is not enabled when a garage door is closed.

Yet another object is to provide a convenient means for overriding the novel circuit whenever desired.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
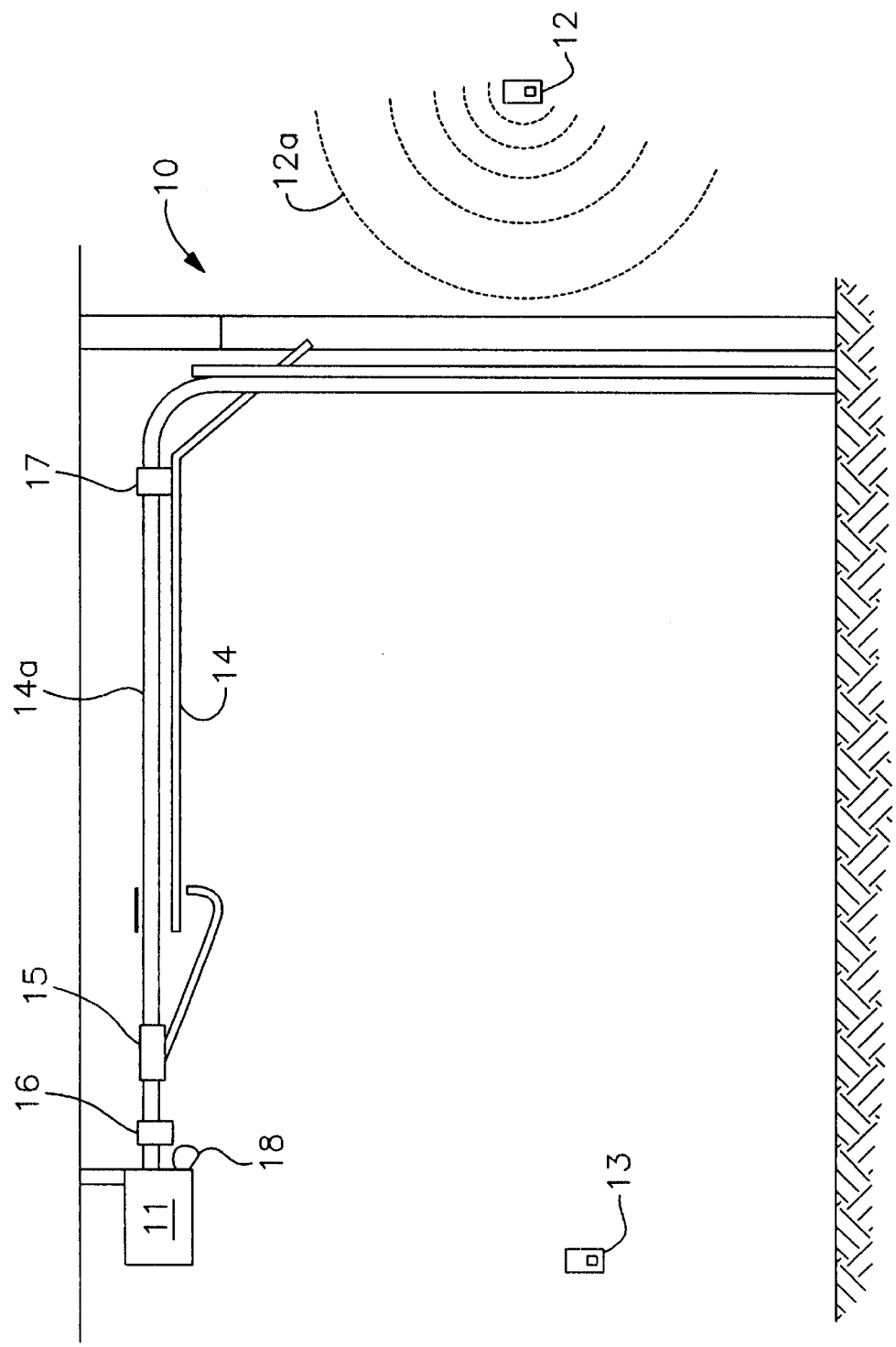
FIG. 1 is a schematic, cross-sectional elevational view of a garage door opener of the prior art.

Referring first to FIG. 1, it will there be seen that a prior art garage door opener and its environment is denoted by the reference numeral 10 as a whole.

Garage door opener 10 includes a housing 11 for a controller means, a radio frequency receiver, and a motor means. The antenna for the receiver is not shown to simplify the drawing.

A first means for operating garage door opener 10 is a transmitter 12 which is typically carried in a motor vehicle; it includes an encoding means so that broadcast signal 12a is in encoded form.

A second means for operating opener 10 is a manually operated, normally open push button switch 13 mounted permanently on a wall of the garage in a convenient location for the homeowner; it is electrically connected by suitable conductors to the controller means in housing 11.

When switch 13 is actuated, an electrical signal is carried by said conductors to the controller means in housing 11, and no encoding or decoding is necessary.

When mobile transmitter 12 is actuated, it sends in encoded radio frequency signal to the receiver means in housing 11; the receiver means decodes the signal and delivers it to said controller means.

A garage door 14 is movably mounted upon a track 14a in a wellknown way. A trolley 15 having an internal stop switch actuator is slideably mounted on said track 14a so that it travels to and actuates first stop switch 16 when garage door 14 is fully open and so that it travels to and actuates second stop switch 17 when said door 14 is fully closed. Actuation of either stop switch 16 or 17 stops the motor means in housing 11 and the controller means in said housing reverses the direction of motor operation so that the next received signal will cause motor operation in an opposite direction. Not all garage door openers have such external stop switches; some rely instead on worm gear arrangements that obviate the need for such externally mounted stop switches.

A lightbulb 18 is activated for a predetermined length of time, such as four minutes, whenever door 14 is closed or opened. The idea is to allow a homeowner to make several trips from the garage to the kitchen to unload groceries, for example, before the light is automatically turned off.

Significantly, when the mechanical assembly of parts depicted in FIG. 1 is in repose, it cannot know whether door 14 is open or closed. Thus, the assembly merely toggles back and forth, opening and closing door 14, in response to signal reception. Thus, light 18 is activated even if the garage door is being closed after having been left open for a length of time sufficient for said light to have been automatically turned off.

Upon reception of an authorized signal, the controller means in housing 11 activates the motor means therein; if garage door 14 is in a closed configuration when such signal is received, the motor means opens the door and if the door is in its open configuration when the signal is received, the motor means closes the door.

Since the controller means in housing 11 has no means for determining which configuration door 14 is in, one cannot write a computer program instructing said controller means to cause said garage door 14 to close if the door is left open for a predetermined length of time. In other words, the same external electrical conditions exist when the door is open as when it is closed, i.e., reception of an authorized signal will cause the system to toggle from one configuration to the next, but the system never knows which configuration it is in. Thus, one cannot program the controller to toggle after the expiration of, say, four minutes, because the door may have been properly closed and such toggling would result in an open door.

Figure 2:
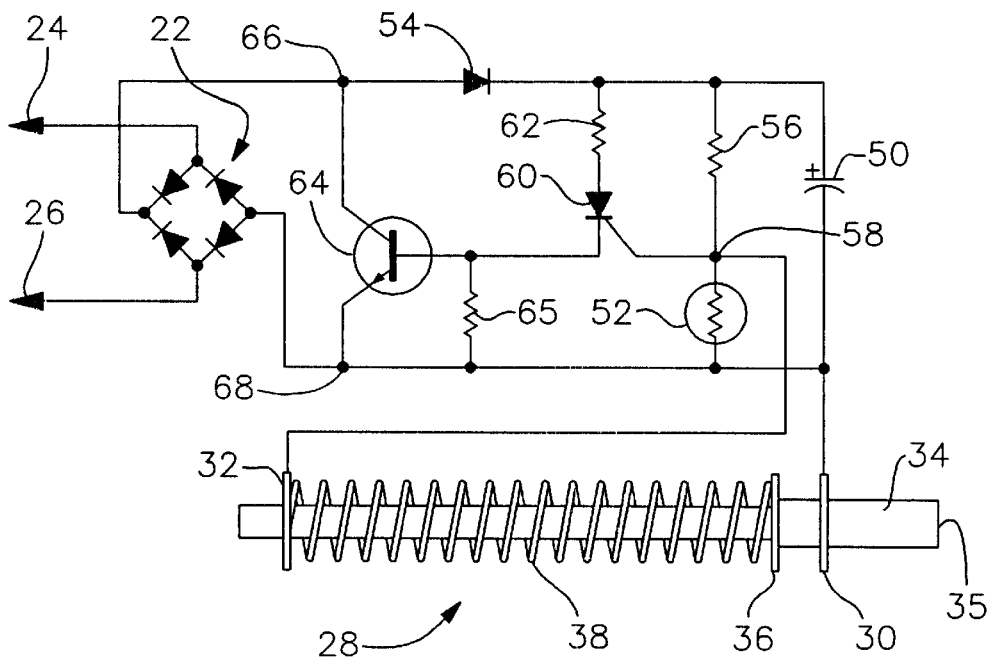
FIG. 2 is a circuit schematic of a first illustrative embodiment of the invention.

The novel circuit 20 of FIG. 2 includes a door-position detector switch, denoted 28 as a whole, that enables the controller means in housing 11 to determine whether or not the door is open so that a door-closing signal may be generated after the lapse of a predetermined amount of time if the door is determined to be open.

Circuit 20 includes a bridge rectifier 22 so that a homeowner retrofitting novel circuit 20 to housing 11 of a conventional garage door opener may attach wires to terminals 24, 26 in either of the two possible ways. Terminals 24, 26 are in electrical communication with the terminals for the permanently mounted, manually operated switch 13 (FIG. 1); the wires from said switch 13 terminate at the controller means in housing 11, and terminals 24, 26 are connected to the same terminals within said controller means.

Circuit 20 is electrically connected in series with door-position detector switch 28. Said detector switch includes stationary electrical contacts 30 and 32 which are centrally apertured to slideably receive movably mounted spring-loaded plunger 34; said contacts are mounted at the leading and trailing end, respectively, of said plunger 34. Plunger 34 has a diameter-reducing shoulder means formed therein, and a third electrical contact 36, fixedly secured to plunger 34 and therefor movable or axially displaceable therewith, is urged into abutting relation with said shoulder by an elongate coil spring 38, or other suitable bias means. In other words, bias means 38 has a trailing end that abuts contact 32 and a leading end that abuts contact 36 and urges it into said shoulder means. The shoulder means is not numbered to simplify the drawing but the reduction in diameter of spring plunger 34 that is provided at the location of contact 36 is clearly depicted.

Figure 3:
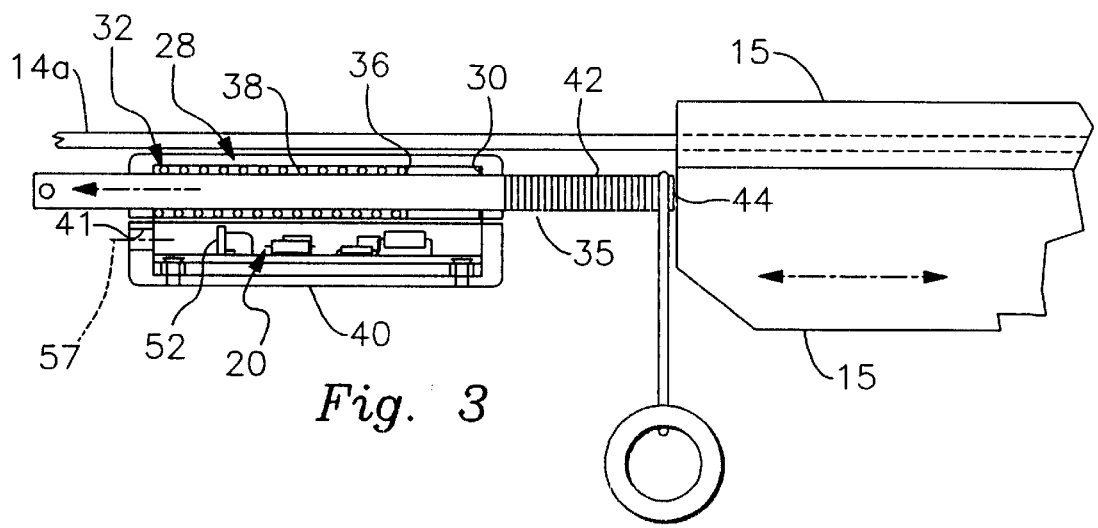
FIG. 3 is a side elevational view of the novel structure when a garage door is fully open.

Referring now to FIG. 3, it will there be seen that circuit 20 and door-position detector switch 28 are housed in casing 40 that is secured by suitable means, such as a double-sided adhesive tape, to an underside of track 14a. An elongate flexible spring 42 ensleeves leading end 35 of plunger 34 and, in effect, extends the effective length of plunger 34; spring 42 is essentially uncompressible and may therefore be thought of as a solid member. Note that the leading end 44 of spring 42 abuts trolley 15 when garage door 14 is fully open.

To install casing 40, door 14 is fully opened by a conventional garage door opener and allowed to coast to a full stop. Casing 40 is then attached to the underside of track 14a by suitable means as mentioned earlier such that elongate spring 42 and hence plunger 34 are axially displaced by trolley 15; such displacement spaces contacts 30 and 36 away from one another so that circuit 20 represents an open switch. In garage door openers having stop switch actuators such as stop switch actuator 16 (FIG. 1), the position of such stop switch actuator is such that it does not interfere with mounting casing 40 in depending, centered relation to track 14a.

When door 14 is in its closed configuration, i.e., when trolley 15 has been displaced to the right of its FIG. 3 position, bias means 38 drives contact 36 into abutting relation to contact 30, thereby closing the switch represented by circuit 20 and door-position detector switch 28. Switch 28 thus behaves like a normally closed, single pole, single throw switch, i.e., it is open only when garage door 14 is open. When said garage door is open, contacts 30 and 36 are spaced apart from one another as aforesaid so that the novel light detection circuitry is enabled.

Reference is now made again to FIG. 2 and the remaining discrete elements of circuit 20. Capacitor 50 (10μfd/25 v) provides power to circuit 20 during the activation interval. Diode 54 directs discharge of capacitor 50 through resistor 62, SCR 60 to transistor 64 base emitter and prevents discharge through the collector emitter when transistor 64 is conducting during the activation interval. Diode 54 also allows charging of capacitor 50 by power available from the controller means in housing 11 during intervals of non-activation.

A light-detecting means in the form of a photodetector or photocell 52 is mounted inside opaque case 40 (see FIG. 3) and is shielded by the case from the influence of ambient light that could keep detector 52 in a high state of conduction. An aperture 41 formed in case 40 admits light from lightbulb 18 (FIG. 1) into said case so that photocell 52 can determine whether said lightbulb is emitting light or not. Since existing garage door openers include controller means for deactivating light 18 after the passage of a predetermined amount of time, as aforesaid, photocell 52 activates circuit 20 when door-position switch 28 is actuated and said light 18 is turned off.

Divider resistor 56 is in series with photocell 52, and terminal 58 represents the electrical junction of said resistor and photocell. When photocell 52 is in a state of high conductivity, i.e., when light bulb 18 is emitting light (indicating that garage door 14 has been opened), the high conductivity of photocell 52 causes the voltage at junction 58 to be at or very near ground potential. This prevents switching means 60, which is preferably a silicon-controlled rectifier (SCR) from activating, i.e., said switching means cannot conduct when its gate is at or near ground potential. Accordingly, switching means 60 serves as an open switch at such time.

When light 18 is extinguished by the conventional controller means within housing 11 at the expiration of said predetermined amount of time, photocell 52 no longer senses light and becomes less conducting, i.e., it represents an increased resistance to ground. The potential of terminal 58 therefore rises to the gate of SCR 60 triggering it on. Accordingly, the anode to cathode resistance drops to a low value. The low anode to cathode resistance of SCR 60 allows current to flow from charged capacitor 50 through resistor 62 into the base of NPN transistor 64, thereby turning it on. When SCR 60 is not turned on, resistor 65 assures that the base of transistor 64 is maintained at ground potential so that it cannot conduct. Once triggered, SCR 60 will continue to conduct until capcitor 50 can no longer supply sufficient current to overcome the required holding current of SCR 60, at which time SCR 60 will turn off abruptly, i.e., it will become nonconducting. Resistor 62 delays the rapid discharge of capacitor 50 through the low anode to cathode resistance of SCR 60 and the base-emitter junction of transistor 64, thereby establishing a time period for which transistor 64 will be turned on. This time period (typically 10 milliseconds) is provided to allow circuitry within the controller means in housing 11 to respond.

In the claims that follow, SCR 60 and its equivalents are referred to as first automatic switch means and transistor 64 and its equivalents are referred to as second automatic switch means. The term "automatic" distinguishes said switches from manually-operated switch means 13. There are any number of solid state or electromechanical relay devices that can perform the function of SCR 60 and NPN transistor 64. SCR 60 is easily triggered, i.e. a nominal change in potential at its gate is sufficient to activate it; accordingly, its use as a switch means is highly advantageous in the novel environment. The base of NPN transistor 64 is normally held at ground potential by resistor 65 but with its base in electrical communication with the output of SCR 60, it is turned on when said SCR becomes a closed switch.

Note that terminals 66 and 68, across which transistor 64 is connected, are electrically connected in parallel with terminals 24 and 26 of normally open push button switch 13. Accordingly, current flow between terminals 66 and 68 activates the controller means in housing 11 in the same way as manual actuation of switch 13. Since the voltage level at manual switch 13 is low (typically 15 VDC), and since said switch 13 has a very low current capacity (a few milliamps), NPN transistor 64 provides a good mimicing of said manual switch 13.

When SCR 60 and hence transistor 64 begin to conduct, the controller means in housing 11 activates the motor means within said housing and said motor means begins to close door 14; the controller means also activates light 18. Photocell 52 senses the light and returns to its high conductance state, which opens switching means 60 and hence switching means 64. Thus, novel circuit 20 respectively mimics the "open" and "closed" positions of normally open push button switch 13.

As door 14 closes, trolley 15 no longer urges against spring 42 so contacts 30, 36 contact one another under the influence of bias means 38, shorting terminal 58 to ground and disabling novel circuit 20. Accordingly, when the controller means in housing 11 thereafter turns off light 18, said light having remained on for a predetermined interval after the door has closed, such turning off of said light does not re-actuate the door opener. A subsequent opening of the door and concomitant reactivation of light 18 drives said contacts 30, 36 apart, however, so that novel circuit 20 is again reactivated so that the door will automatically close upon the next deactivation of light 18 by said controller means. Thus it is understood that the novel circuit is enabled only when the garage door is open, i.e., the novel design lets a garage door opener know, in effect, whether the door is open or closed.

Figure 4:
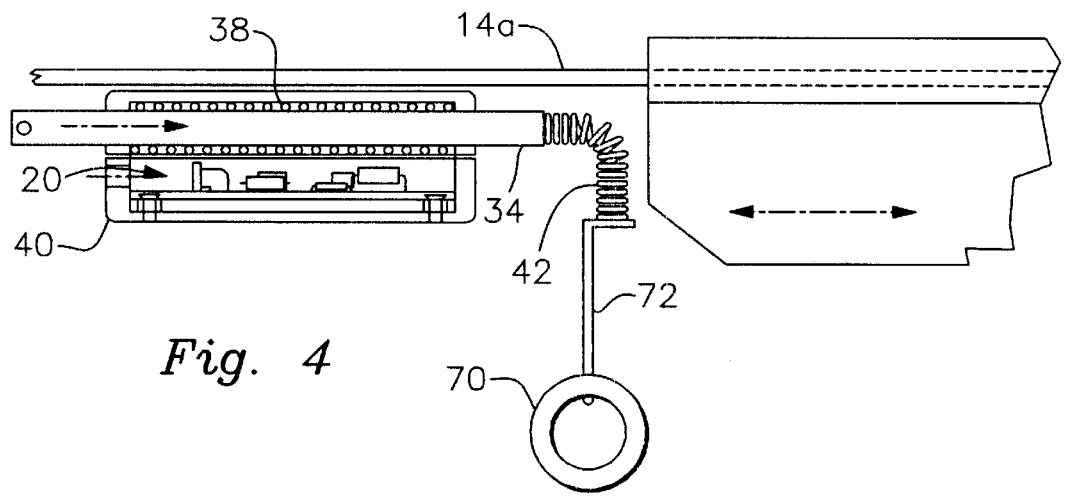
FIG. 4 is a side elevational view of the novel structure when it has been manually deactivated.
Figure 4A:
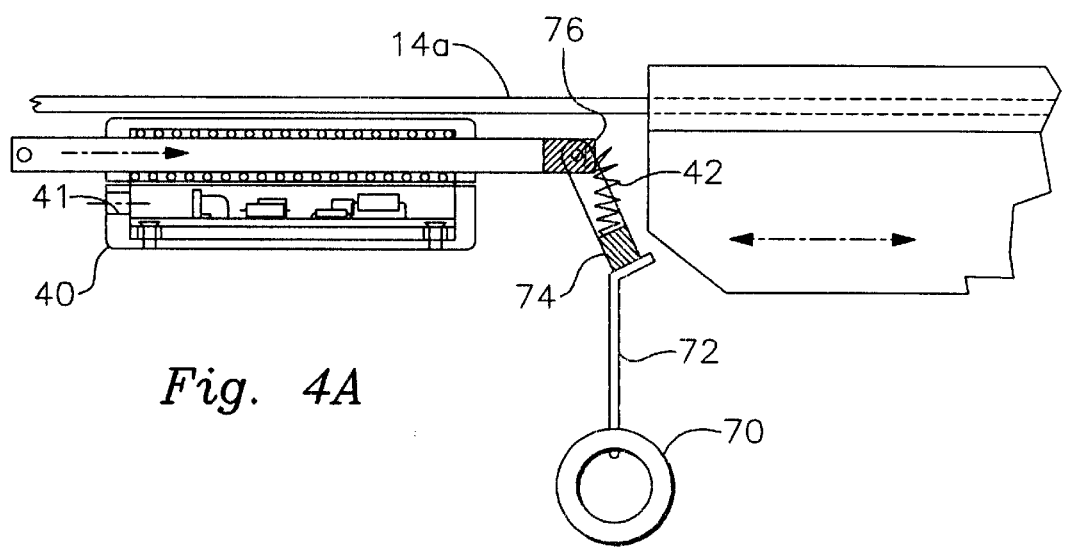
FIG. 4A is a side elevational view of a second embodiment of the novel structure when it has been manually deactivated.

If a user wants to override or cancel the novel door-closing sequence, the leading end of spring 42 is pulled downwardly so that it misaligns with trolley 15 in the manner depicted in FIGS. 4; this unloads spring 38 just as if trolley 15 had been displaced to the right by a door-closing operation. Spring 38 urges contacts 30 and 36 into contacting relation to one another when said spring 42 and trolley are misaligned. A ring 70 attached to a string 72 that is secured to said leading end of spring 42 is provided for this purpose; numerous other means for allowing bias means 38 to urge contacts 30, 36 together are well within the scope of this invention. For example, in FIG. 4A, a rigid, pivotally mounted member 74 provides a housing for spring 42 and is pivoted about pivot point 76 when ring 70 is pulled downwardly. This disables novel circuit 20 as mentioned earlier and restores the garage door opener to conventional operational status. To restore operation of novel circuit 20, spring 42 is returned to its FIG. 3 position.

Where no ability to disable circuit 20 is desired, extension spring 42 is simply not used and trolley 15 directly abuts the leading end 35 of plunger 34 when door 14 is open.

Although the novel structure has been identified as being suitable for retrofitting to existing openers, it is clearly within the scope of this invention to incorporate the novel features disclosed herein into a garage door opener as a part of its original equipment.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:
1. An automatic garage door closer having a motor means, a manually-operated switch means, and a controller means for controlling operation of the motor means and for activating a light, source upon opening of a garage door and for extinguishing said light source a predetermined amount of time after said garage door has been opened, comprising:

a light-detecting means for detecting presence or absence of light;

a first automatic switch means that is actuated when said light-detecting means detects absence of light;

a means for storing electrical energy that is in electrical communication with said light-detecting means;

a second automatic switch means that is actuated when said means for storing electrical energy discharges in response to detection of absence of light;

said second automatic switch means being electrically connected in parallel to said manually-operated switch means so that actuating said second automatic switch means activates said motor means and causes closing of said door; and a door-position detector switch that enables the light-detecting means when the garage door is open and which disables said light-detecting means when the garage door is closed;

whereby a garage door left open automatically closes when said light is extinguished by said controller means.

2. The garage door closer of claim 1, said door-position detector switch further comprising:

a movably mounted plunger that is displaceable along its longitudinal axis;

a fixed position pair of electrical contacts mounted at opposite ends of said plunger including a leading and a trailing contact; and a movable electrical contact secured to said plunger, said movable electrical contact being spaced apart from said leading contact when said garage door is in said fully open configuration.

3. The garage door closer of claim 2, said door-position detector switch further comprising:

a bias means for axially displacing said plunger into a position of repose when said garage door is closed, said movable electrical contact and said leading contact being in contacting relation to one another when said garage door is closed.

4. The garage door closer of claim 3, further comprising an annular shoulder means formed in said plunger, said bias means urging said movable electrical contact into abutting relation to said annular shoulder means.

5. The garage door closer of claim 4, further comprising disabling means for disabling said light-detecting means even when a garage door is open.

6. The garage door closer of claim 5, wherein said disabling means includes a flexible, substantially uncompressible extension means mounted to a leading end of said plunger in axial alignment therewith and means for misaligning said extension means from said axial alignment so that said movable electrical contact is urged into contacting relation to said leading contact even when said door is fully open.

7. The garage door closer of claim 6, wherein said extension means is a spring.

8. The garage door closer of claim 1, wherein said light detecting means is electrically connected in series with a resistor so that a junction between said light-detecting means and said resistor is held at substantially ground potential when said light-detecting means is detecting light and wherein said junction is at a substantially higher potential than ground when said light-detecting means detects absence of light, said light-detecting means being in a conductive state when detecting light and being in a non-conductive state when detecting absence of light.

9. The automatic garage door closer of claim 1, wherein said first automatic switch means is a silicon-controlled rectifier.

10. The automatic garage door closer of claim 9, wherein a gate of said silicon-controlled rectifier is held substantially to ground potential when said light-detecting means is detecting light, said light-detecting means being in a conductive state when it is detecting light.

11. The automatic garage door closer of claim 1, wherein said second automatic switch is a transistor.

12. The automatic garage door closer of claim 1, wherein said means for storing electrical energy is a capacitor.

13. The garage door closer of claim 12, wherein said light detecting means is a photocell.

14. The garage door closer of claim 1, further comprising a bridge rectifier means electrically connected in parallel between said manually-operated switch means and said second automatic switch means.

* * * * *